US008225391B2

(12) United States Patent
Labaton

(10) Patent No.: US 8,225,391 B2
(45) Date of Patent: Jul. 17, 2012

(54) SYSTEM AND METHOD FOR IMPROVING RESTRICTIVENESS ON ACCESSING SOFTWARE APPLICATIONS

(75) Inventor: Isaac J Labaton, Jerusalem (IL)

(73) Assignee: Cidway Technologies, Ltd., London (GB)

(*) Notice: Subject to any disclaimer, the term of this patent is extended or adjusted under 35 U.S.C. 154(b) by 777 days.

(21) Appl. No.: 11/668,285

(22) Filed: Jan. 29, 2007

(65) Prior Publication Data
US 2007/0180234 A1 Aug. 2, 2007

(30) Foreign Application Priority Data

Jan. 31, 2006 (IL) ........................... 173463

(51) Int. Cl.
G06F 12/14 (2006.01)
G06F 7/04 (2006.01)
G06F 21/00 (2006.01)
H04L 29/06 (2006.01)
H04L 9/32 (2006.01)
H04L 9/00 (2006.01)
H04L 9/28 (2006.01)
H04K 1/00 (2006.01)

(52) U.S. Cl. ............... 726/19; 726/5; 726/7; 726/28; 726/29; 713/165; 713/168; 713/170; 713/184; 713/189; 380/255; 380/262; 380/44; 380/28

(58) Field of Classification Search ............ 726/19, 726/5, 7, 28, 29; 713/165, 168, 170, 184, 713/189; 380/255, 262, 44, 28
See application file for complete search history.

(56) References Cited

U.S. PATENT DOCUMENTS
2002/0144128 A1* 10/2002 Rahman et al. ............... 713/186
2002/0178370 A1 11/2002 Guervich et al.
(Continued)

FOREIGN PATENT DOCUMENTS
CN 1408178 A 4/2003
CN 1414765 A 4/2003

OTHER PUBLICATIONS

The International Search Report and Written Opinion from corresponding International Application No. PCT/IB07/02543 dated May 14, 2009.

(Continued)

Primary Examiner — Aravind Moorthy

(74) Attorney, Agent, or Firm — Snell & Wilmer, LLP

(57) ABSTRACT

Systems and methods for improving the restrictiveness on accessing software applications on mobile devices, such as cell phones, are disclosed. In accordance with an exemplary embodiment, a computer-implemented system and method for improving the restrictiveness on accessing software applications comprises using a device having a memory, wherein the software application is stored in the memory and requesting, from the user, an original PIN, wherein the original PIN is not stored in the memory and any information about the original PIN is not stored in the memory. The invention further comprises using the original PIN as a seed number to create a true encryption key, using the true encryption key to encrypt an application secret data into a ciphertext and storing, in the memory, the ciphertext. The invention further comprises requesting a PIN from an accessing person that is accessing the targeted software application, wherein the requested PIN is not validated by the software application, using the requested PIN, without any validation, as the seed number to create an encryption key, and using the encryption key to decrypt the ciphertext.

13 Claims, 3 Drawing Sheets

U.S. PATENT DOCUMENTS

| | | | |
|---|---|---|---|
| 2003/0084301 A1 | 5/2003 | Krawetz | |
| 2003/0084304 A1* | 5/2003 | Hon et al. | 713/185 |
| 2003/0120925 A1 | 6/2003 | Rose et al. | |
| 2003/0229791 A1 | 12/2003 | DeJong | |
| 2004/0083373 A1* | 4/2004 | Perkins et al. | 713/189 |
| 2004/0181673 A1 | 9/2004 | Lin et al. | |
| 2005/0050323 A1* | 3/2005 | Mizrah | 713/168 |
| 2007/0094394 A1* | 4/2007 | Singh et al. | 709/226 |
| 2007/0250918 A1* | 10/2007 | Aboual Chamat | 726/5 |

OTHER PUBLICATIONS

Office Action dated May 6, 2011 for Canadian Patent Application No. 2,641,258.

Notice of Allowance dated Oct. 28, 2011 for Russian Patent Application No. 2008134875.

Office Action dated Feb. 3, 2012, Chinese Patent Application No. 200780007358.5.

* cited by examiner

SYSTEM AND METHOD FOR IMPROVING RESTRICTIVENESS ON ACCESSING SOFTWARE APPLICATIONS

FIELD OF INVENTION

The present invention relates generally to accessing software applications on mobile devices, and in particular to improving the restrictiveness on the access to software application on mobile devices.

BACKGROUND OF THE INVENTION

The use of a personal identification number (PIN), as well as the use of passwords, which is wider due to the fact that passwords enable additional characters (e.g., alphanumeric), in order to restrict the access to software applications and services, is universal, and broadly established.

Yet, the weakness of using PINs and/or passwords to restrict access is well known. For example, a PIN or password can be easily stolen when used, especially when it is transmitted. One of the most accepted ways to overcome the weakness caused by the exposure of secret PINs or passwords, is instead using "One-Time-Passwords". That is, a PIN or password that is good for one use only.

Clearly, if the one time password is exposed when it is being used, the exposure does not constitute a problem, because the one time password is invalid for further use. Now, the entity accessing the service or application (hereinafter, referred to as the "targeted application") should use what is referred to as password generator devices in order to obtain a valid one time password for the next access.

These password generator devices usually use sequential algorithms or time dependent algorithms in order to seed the computation of the one time password and then display them for the accessing person. This solution of the problem of the exposure of the PIN/password has created another problem. That is, what happens if the one time password generator falls into unauthorized hands? Clearly, the criminal would then be in an ideal situation for accessing the "would be" restricted targeted application.

This new problem, that is, the possibility that the one time password generator will fall into unauthorized hands, may be easily solved by requesting a constant or fixed PIN or password in order to use the one time password generator. This time, the fact that the PIN/password is constant, does not constitute a problem, due to the fact that such a fixed PIN/password is not transmitted, and the constant password is only used or entered into the one time password generator, and thus is not easily exposed.

Naturally, the fact that the accessing entity should carry an additional device, the one time password generator, is not an advantage to say the least. And it is widely seen as an inconvenient situation.

As the universal trend is to carry one device, the cell phone, for all possible uses, the natural approach is to use the accessing entity's cell phone as a one time password generator. That is, downloading into the cell-phone a software application that is able to compute the one time password and, thus converting the cell phone into a one time password generator, among other functions.

This approach is extensively used these days and several companies are marketing this kind of solution. Nevertheless, a relatively new problem as now been acknowledged. We refer here to the lack of security of cell phone software applications.

Cell phone applications are easily exposed, hacked, and penetrated, and thus are insecure, especially Java based applications. Java applications are effortlessly reverse-engineered, and it is hard to keep data secret, such as a password, to a skilled intruder.

Now, the fact that the very nature of the PIN/password principle is a shared secret constitutes a weakness of the method presently in use for restricting the access to applications. The fact that the knowledge of the secret PIN/password is not restricted to the entity accessing the service or application, but must be also known to the restricted cell phone one time password generator application, is, indeed, a security hole. Why should the application know the PIN? It is necessary in order to enable the application to verify and compare the password entered by the accessing entity to the correct PIN/password.

If the hacker can read the cell phone memory and hence read the expected password, he also can use the one time password generator software, in the same manner as the authorized owner.

Summarizing, one of the weaknesses of the fixed password method derives from the fact that the one time password generator application that is to be accessed knows the secret, and therefore, if a criminal may access such secret, implies that the criminal knows the password, and can impersonate the authorized entity and therefore access the one time password generator application.

A straight-forward approach used to overcome the above referred security hole, includes keeping or storing the hash value of the fixed PIN instead of keeping the PIN. As it is well known, any hash function is a one way function, and it is theoretically impossible to go the reverse way, from the hash value of the PIN to the PIN itself. This fact overcome the security problem referred above, due to the fact that, assuming a hacker read the hash value of the PIN, he will be unable to infer the PIN, and thus the one time password generator application restrictiveness seems secured. Most of the one time password generator cell phone software applications are using the hash functions this way.

But, the security is apparent only as there is an easy way for the hacker, to overcome this hash obstacle. One of the purposes of the present invention is to expose the lack of security inherent to the present in use approach of storing hash values of the PIN and to show a method that truly overcome the lack of security of the cell phone PIN restricted application of the type of the one time password generator.

While it is perfectly true that the hash functions are irreversible, and therefore the attacker can not deduct or infer from the hash value of the PIN, the PIN itself. The attacker can copy the entire one time password generator application to a PC and create a script that will simply try all the possible PIN combinations, until the moment that, eventually the correct PIN will be entered and, consequently the one time password generator application will work in the PC.

Therefore, the attacker can know the correct PIN that runs the specific application in a specific cell phone. It is worth noting that in the case where the one time password generator application limits the trials, enabling a limited number of consecutive wrong PINs, this limitation is easy to overcome by restarting the application in the PC.

Naturally, the attacker can run it and the one time password generator application will display the one time password value that is right for this moment. Consequently, the attacker can access the targeted application, thus, ruining the restrictiveness to the targeted application. The clear conclusion is that the present-in-use method of protecting the access to a cell phone one time password generator application, requesting a PIN, is not secure.

BRIEF DESCRIPTION OF THE DRAWINGS

A more complete understanding of the present invention may be derived by referring to the detailed description and claims when considered in connection with the drawing Figures, where like reference numbers refer to similar elements throughout the Figures, and:

DETAILED DESCRIPTION OF THE INVENTION

Figure 1:
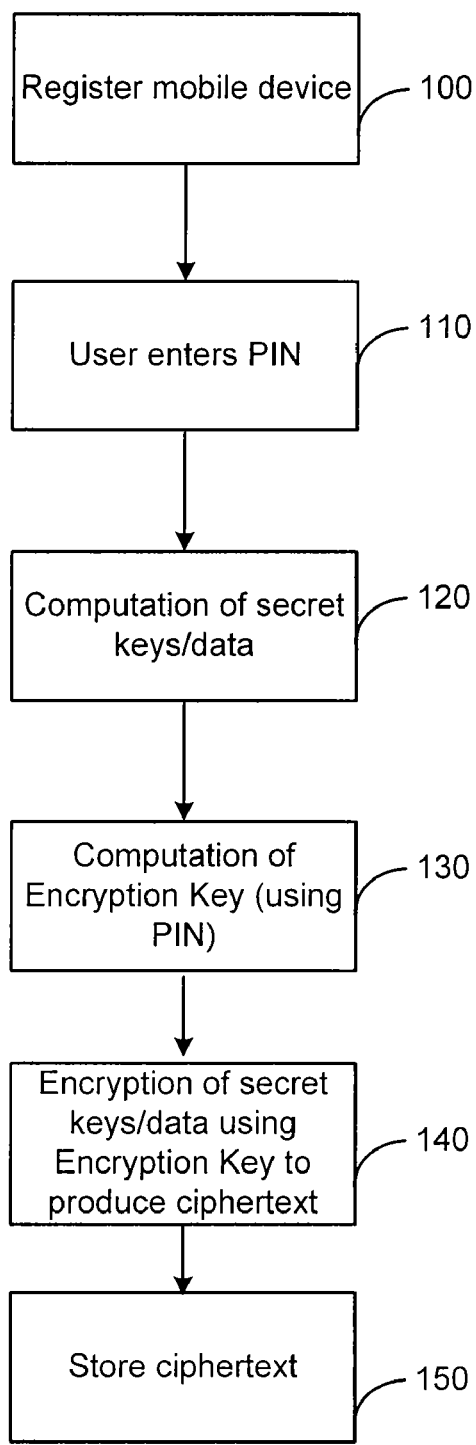
FIG. 1 illustrates a method of generating and using an encryption key based on a valid PIN in accordance with an embodiment of the present invention.

The present invention may be described herein in terms of various components and processing steps. It should be appreciated that such components and steps may be realized by any number of hardware and software components configured to perform the specified functions. For example, the present invention may employ various electronic control devices, visual display devices, input terminals and the like, which may carry out a variety of functions under the control of one or more control systems, microprocessors or other control devices. In addition, the present invention may be practiced in any number of mobile devices, and a cell phone is just one exemplary mobile device that may be used with the present invention.

The present invention relates to a system and method that improves the security of the one time password generator applications, especially, the ones which are downloaded and/or are running in cell phones. According to the present invention, once the customer sets up the application, and establishes the PIN, the PIN will not be stored in the cell phone memory, and the hash value of the PIN will not be stored in the cell phone at all, nor will any other derivative of the PIN be stored in the cell phone.

It should be appreciated that in accordance with one aspect of the present invention, the customer selected PIN will not be memorized or otherwise stored inside the cell phone, nor external to the cell phone, such as any cell phone appliance such as a subscriber identity module (SIM) card, an universal serial bus (USB) connected appliance, or a wireless appliance. In addition, in accordance with an aspect of the present invention, the PIN will not be transmitted to another entity in order to be stored, nor will any number result of a one way function acting on the PIN.

Stated another way, such selection of a PIN in accordance with the present invention, will be made by the customer, and usually will only be known to the customer. The expected question is: How can the application restrict the access to the authorized user only, if the software application does not know the PIN? How the one time password generator application in the cell phone can verify or confirm or validate that the PIN is correct if it has no memory of the customer selected PIN, nor of the PIN derivatives (e.g., the PIN's hash value)? The conclusion is that the software application cannot verify or confirm or validate the PIN entered by the customer.

There is no way the one time password generator application can verify if the PIN is correct without having any information about such PIN. This impossibility, precisely, is one of the advantages of the present invention over the previously used methods. This means that the one time password generator application will run including if the PIN is a wrong PIN. The attacker, trying a different PIN will have no hint if he succeeded or not guessing the correct PIN. The application will generate and display a one time password in any case. But the present invention provides a stronger protection than the previously used methods in securing the restrictiveness of the one time password (OTP) generator application.

With reference to FIG. 1, in accordance with one embodiment of the present invention, when the PIN is first entered (step 110), usually during or immediately after the registration (step 100), the present invention provides for the computation of the application's secret keys/data ("A.S.K.") (step 120), and the computation of an encryption key, "K" (step 130), the last (K) being a strong function of the PIN selected by the cell phone owner. In accordance with an embodiment of the present invention, a method of the present invention also provides for the encryption of the A.S.K. ($e_K$ [A.S.K.]) using "K" (step 140). Of course, the application will not keep in any cell phone memory the "K", nor the PIN, but naturally will store the $e_K$ [A.S.K.] also referred to as the ciphertext (step 150).

Figure 2:
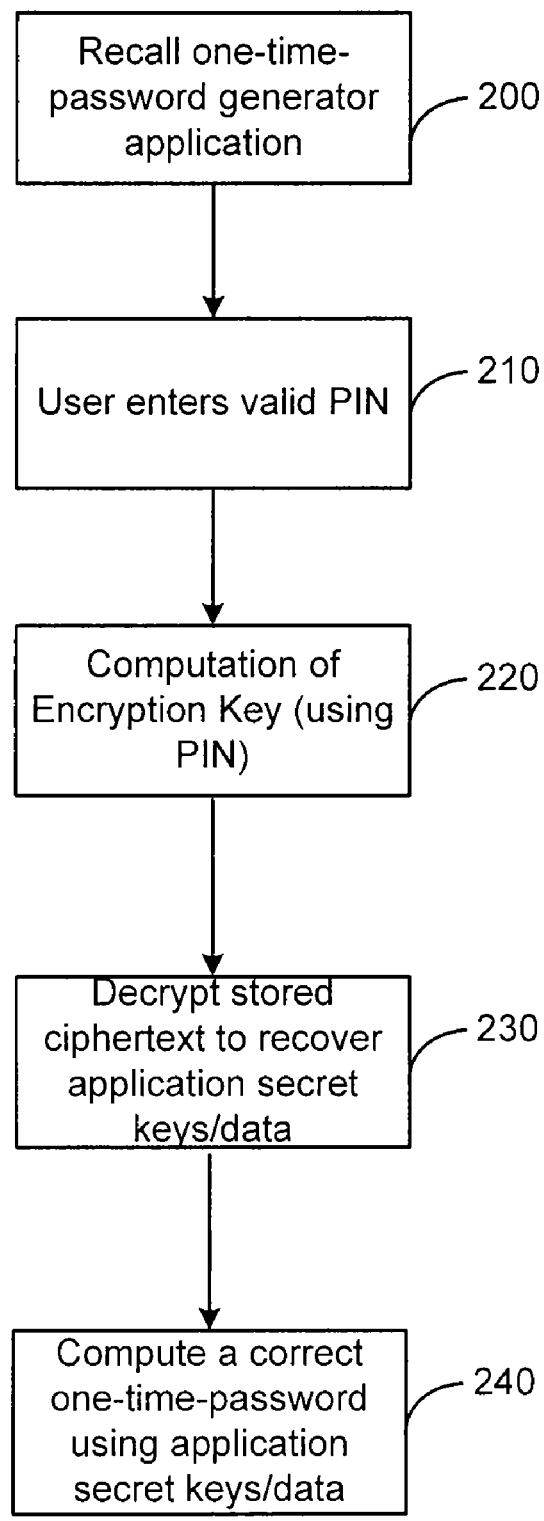
FIG. 2 illustrates a method of computing a correct password in accordance with an embodiment of the present invention.

In this manner, with reference to FIG. 2, every time the true owner of the cell phone, would like to have a OTP, generated with the help of the OTP generator application running in his cell phone, the true owner may recall the OTP generator application (step 200), enter the PIN (step 210) which is only known to the true owner, and the OTP generator application will compute the encryption key "K" (step 220), and with such "K" it will decrypt the memorized $e_K$[A.S.K.] (step 230), $$d_K[e_K[A.S.K.]]=A.S.K.$$

thus, recuperating the A.S.K. and therefore the OTP generator application, knowing the A.S.K. will be ready to compute a correct OTP.

Figure 3:
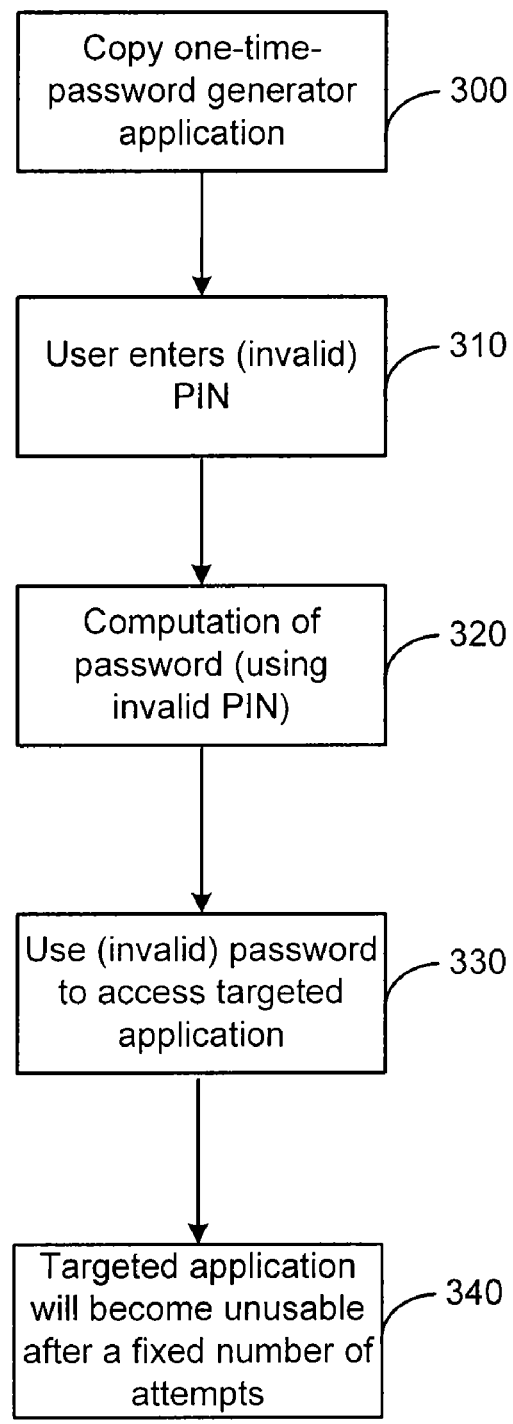
FIG. 3 illustrates a method of restricting access to a software application in accordance with an embodiment of the present invention.

In contrast, with reference to FIG. 3, an unauthorized person such as an attacker, trying to obtain a correct OTP from the application, can copy the application into a PC (step 300), run it there, in the PC, in a systematic way, trying all the possible PIN combinations, and each time the maximal number of guessing become exhausted, he can start again in the PC, re-running the application until the correct PIN guessed will run the application. But according to the method of the present invention, any PIN entered (step 310), good or bad will run the application, generating an OTP (step 320), however, such an OTP will be wrong in all the cases, as the wrong PIN was entered, therefore, the only way the attacker have in order to find out if the guessed PIN is good or not, is using the to-be-checked OTP to access the server's targeted application (step 330), the original one. Now, due to the fact that the attacker is not in control of the targeted application, he will be enabled to only try a very limited number of consecutive wrong OTPs, (say 5 trials) and immediately after the attacked account will become unusable and discontinued (step 340). Therefore the attacker is unable to access the targeted application and succeed. Thus, the restrictiveness has worked.

This is the reason that the method of the present invention indeed provides for a way to overcome the attacks due to the lack of security in the cell phones, and due to the well recognized attacker potential access to all the secret data kept in the cell phone memory. According to the method of the present invention, due to the fact that the PIN is not stored or transmitted, it is impossible to steal it.

While the virtues and advantages of the present invention, on how to improve the security of applications running in cellphones, has been explained here above, using one time password generator applications, it is clear to people skilled in the field that the same method proposed here above can be used to improve the security and to restrict the access to any desired application running in a non secure device (i.e., a cell-phone, a PDA, a PC), wherein an attacker can access any secret stored in the device memory.

In accordance with another embodiment of the present invention, showing how the method of the present invention improves the restrictiveness of a "must-be-restricted" application running in a cell phone, we will refer here below to an application which generates PKI Digital Signatures on data entered in the cell phone. For further information on applications that generate digital signatures, please refer to applications as described in GB Patent No. 2374182 and U.S. Pat. No. 6,912,659 granted to the inventor of the present invention. Obviously, the PKI private key should be kept secure against any possibility that an unauthorized person will gain access to such knowledge, and consequentially, be able to digitally sign documents, impersonating the rightful owner of the private key. In addition, U.S. Pat. No. 6,912,659 describes methods for maintaining the public key confidential and secret.

As in the former case, the possibility that a digital signature application, running in a cell-phone, will fall in unauthorized hands, may be easily avoided by requesting a constant PIN or Password in order to put into effect the application. Nevertheless, as stated above, cell phone applications are easily exposed, hacked, penetrated and insecure. Now, the fact that the very nature of the password principle is a shared secret constitutes a weakness of this defense, of this access restriction.

As explained above, when referring to the OTP generator application, the fact that the knowledge of the secret, the password, is not limited to the entity accessing the service or application, but must be also known to the restricted cell phone digital signature application, according to the present-in-use defense methods, is, indeed, a security hole.

Clearly, if the hacker can read the cell phone memory and hence read the expected password, he also can use the digital signature application software, in the same way as the authorized owner. As a result, one of the weaknesses of the fixed password method derives from such fact that the digital signature application to be accessed knows the secret (i.e., the PIN, the hash value of such PIN or the like), and therefore, if a criminal may have access to such secret, implies that the criminal knows the password, and can impersonate the authorized entity and therefore can use the digital signature application. The lack of security inherent to the prior use approach of using hash values of the PIN has already been discussed.

The attacker can copy the digital signature application to a PC and create a script that will simply try all the possible PIN combinations, until the moment that, eventually the correct PIN is entered and the digital signature application in a PC will work. Therefore, the attacker can know the correct PIN which runs the specific application, that is, the digital signature application in a specific cell phone.

The clear conclusion is that the previously used method of protecting the access to a cell-phone digital signature application, by requesting a PIN, is not secure. Now, it will be shown that the method of the present invention indeed provides for a way to overcome the lack of security in the cell phones, and the well recognized attacker potential access to all the digital signature application secret data stored in the cell phone memory.

As in the former example, (OTP generator) according an embodiment of the present invention, once the customer sets Lip the digital signature application, and establishes the PIN, such PIN will not be kept in the cell phone memory, nor the hash value of such PIN will not be kept in the cell phone at all, not any other derivative of the PIN which can be used to verify or confirm if a trial PIN is the correct PIN.

As before, the customer selected PIN will not be memorized or otherwise stored inside the cell-phone, nor external, in any cell phone appliance. This means that the PIN will not be transmitted to another entity in order to be kept, nor the PIN, nor any number result of a one way function acting on the PIN. Stated another way, such selection of a PIN, which runs the digital signature application, will be known to the authorized customer only. Also as before, there is no way the digital signature application can verify if the newly entered PIN is correct without having any information about such PIN. This means that the digital signature application will run including if the PIN is a wrong PIN, generating a digital signature, which will be a non-valid one. The attacker, trying different PINs will have no hint if he succeeded or not guessing the correct PIN. The application will generate a digital signature in any case.

As stated above, the present invention provides a stronger protection than the present in use restriction defenses based in storing the hash value of the PIN. In accordance with an embodiment of the present invention, a method provides, when first entered the selected PIN, during the enrollment, for the computation of the PKI pair, private and public keys, and the computation of an additional encryption key, "K", being the last ("K") a strong function of the PIN selected by the cell phone owner in order to restrict access to the PKI private key to only an entity who knows the PIN. The method of this invention also provides for the encryption of the PKI private key, $$e_K[\text{PKI PRIVATE KEY}]$$

using the "K". Of course, the application will not keep in the cell-phone memory the "K", nor the PIN, but the application will keep the $$e_K[\text{PKI PRIVATE KEY}]$$

In this manner, every time that the true owner of the cell phone, would like to digitally sign some data using the digital signature application running in the owner's cell phone, the cell phone owner will recall the digital signature application, enter the PIN which is only known to the cell phone owner, and the Digital Signature application will compute the encryption key "K", and with such "K" it will decrypt the memorized $e_K$ [PKI PRIVATE KEY], $$d_K[e_K[\text{PKI PRIVATE KEY}]]=\text{PKI PRIVATE KEY}.$$

and therefore the digital signature application, knowing the PKI private key will be ready to compute a correct digital signature on the desired data.

In the situation where an attacker or any unauthorized person who does not know the correct PIN, tries to access the digital signature application. In that situation, the attacker can plan to copy the application into a PC, to run it there, in the PC, in a systematic way, trying all the possible PIN combinations, and each time the maximal number of guessing become exhausted, he can restart again in the PC, re-running the application until the correct PIN guessed will run the application. But according to the method of the present invention, any PIN entered, good or wrong will run the digital signature application, generating a digital signature, but such digital signature will be wrong in all the cases if the wrong PIN was entered, therefore, the only way the attacker have in order to find out if the guessed PIN is good or not, is using the computed digital signature obtained with a trial PIN (i.e., sending a digitally signed instruction to the bank to execute a transaction).

Now, due to the fact that the attacker is not in control of the bank digital signature application, the attacker will only be enabled to try a very limited number of consecutive wrong digital signatures (for example, 5 trials) and the attacked account will then become unusable, and discontinued from the point of view of digital signature bank applications. Therefore the attacker will be unable to impersonate and succeed.

Thus, again, in accordance with an embodiment of the present invention, a symmetrical encryption key "K" which, on one hand is computed as an strong function of the selected PIN, and on the other, this "K", as well as the PIN, is not kept in the memory of the device, nor in any of the device appliances, like the SIM card, a USB token, any additional SIM card, additional CPU, or the like, but, this "K" is computed every time the PIN is entered, and therefore, obviously, the application only will re-compute the true "K", if the corrected PIN was entered, this fact increases the restrictiveness of the application in spite that the attacker may reach any device memory.

This is because, if the re-computed encryption key is not the correct "K", but say, any different key "W", inferred from a wrong PIN entered, thus the mathematical operation $$d_W[e_K[\text{PKI PRIVATE KEY}]] = \text{WRONG Private Key}$$

will result in a wrong private key.

And the digital signature computed using such a wrong private key, will be inconsistent with the X.509 Certificate's Public Key, therefore the digital signature will be invalid. As previously mentioned, the public key or the certificate itself should not be opened to public knowledge as described in the above referenced patents. Evidently the attacker will have only a few opportunities to send wrong digital signatures to the financial institution waiting for the customer digitally signed instruction, and consequently the attacker will fail in his intent to impersonate the authorized customer.

It should be appreciated that the method of the present invention, which has been exemplified using two different cell phone security applications or embodiments, is independent of the application itself and may be used in any application which need restrictiveness and run is an environment where it is hard to stop an attacker in his intent to read the secrets stored in the device memory.

Furthermore, the method in accordance with an embodiment of the present invention, also provides for a way to change and renew the selected PIN, wherever the authorized customer, who knows the true PIN, would like to change it.

When the authorized customer, announce to the application, say, after entering the correct PIN (old PIN), his intent to change and renew the old PIN by a new one (new PIN), the application computes the encryption key "K" using the old PIN just entered, and decrypts the encrypted application secrets key $$d_K[e_K[A.S.K.]] = A.S.K$$

recuperating the application secrets key. Now, using the new PIN the application computes a new encryption key "nK" and using such "nK" encrypts the A.S.K.

$$e_{nK}[A.S.K.]$$

and the application will kept it (the $e_{nK}[A.S.K.]$) in the device memory. From now on the correct result will be generated by the application only if the new PIN is entered.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. The scope of the present invention is accordingly to be limited by nothing other than the appended claims, in which reference to an element in the singular is not intended to mean "one and only one" unless explicitly so stated, but rather "one or more." All structural and functional equivalents to the elements of the above-described exemplary embodiments that are known to those of ordinary skill in the art are expressly incorporated herein by reference and are intended to be encompassed by the present claims.

I claim:

1. A method for improving restrictiveness on using a software application, wherein access to the software application is restricted by requesting a personal identification number (PIN) from a user, comprising:
    using a device having a memory, wherein the software application is stored in the memory;
    requesting, from the user, to enter an original PIN, wherein the original PIN is not stored in the memory and any information about the original PIN is not stored in the memory;
    using the original PIN as a seed number to create a true encryption key;
    using the true encryption key to encrypt an application secret data into a ciphertext;
    storing, in the memory, the ciphertext, wherein the ciphertext is never transmitted to a server; and
    wherein:
        any time the software application is accessed by any person, a PIN is requested from the accessing person, and the requested PIN is not validated by the software application;
        the requested PIN, without any validation, is used as the seed number to create an encryption key;
        the encryption key is used to decrypt the ciphertext;
        using the decrypted ciphertext to compute a one-time-password, even if the requested PIN does not match the original PIN; and
        using the one-time-password to access a targeted software application.

2. The method of claim 1, wherein the PIN comprises a password.

3. The method of claim 1, wherein the PIN comprises a combination of a password and a number.

4. The method of claim 1, wherein the device comprises a cellular phone.

5. The method of claim 4, wherein the device memory comprises an external appliance.

6. The method of claim 5, wherein the external appliance comprises a subscriber identity module (SIM).

7. The method of claim 5, wherein the external appliance comprises an universal serial bus (USB) connected device memory.

8. The method of claim 5, wherein the external appliance comprises a wireless memory device.

9. The method of claim 1, wherein the software application is configured to generate a dynamic identification code.

10. The method of claim 1, wherein the software application is configured to generate a digital signature.

11. The method of claim 1, wherein the software application is configured to generate an authentication code.

12. The method of claim 1, wherein the software application is configured to encrypt and store data encrypted with the application secret data.

13. The method of claim 1, wherein the software application is configured to establish an encrypted communication session.

* * * * *